United States Patent [19]

Koepernik et al.

[11] 3,894,967

[45] July 15, 1975

[54] CATALYST FOR PURIFYING EXHAUST GASES

[75] Inventors: Karl Hermann Koepernik, Hannover; Günter Weidenbach, Anderten; Gerhard Koch, Nienburg, Weser, all of Germany

[73] Assignee: Kali-Chemie Aktiengesellschaft, Hannover, Germany

[22] Filed: Jan. 24, 1974

[21] Appl. No.: 436,152

[30] Foreign Application Priority Data

Jan. 26, 1973 Germany.............................. 2303695

[52] U.S. Cl........................... 252/466 PT; 423/213.5
[51] Int. Cl.............................................. B01j 11/12
[58] Field of Search............ 252/466 PT; 423/213.2, 423/213.5

[56] References Cited

UNITED STATES PATENTS

| | | | |
|---|---|---|---|
| 3,310,366 | 3/1967 | Koepernik | 423/213.5 |
| 3,331,787 | 7/1967 | Keith et al. | 252/466 PT |
| 3,392,125 | 7/1968 | Kelly et al. | 423/213.2 |
| 3,458,276 | 7/1969 | Bloch | 423/213.5 |
| 3,701,822 | 10/1972 | Negra et al. | 252/471 X |
| 3,741,725 | 6/1973 | Graham | 423/213.5 |

FOREIGN PATENTS OR APPLICATIONS

| | | | |
|---|---|---|---|
| 995,598 | 6/1965 | United Kingdom | 423/213.5 |
| 1,442,743 | 6/1972 | Germany | 423/213.5 |

*Primary Examiner*—W. J. Shine
*Attorney, Agent, or Firm*—Richard L. Schwaab

[57] ABSTRACT

Disclosed is a catalyst suitable for the purification of automobile exhaust gases and a method for the preparation of this catalyst comprising the steps of impregnating an aluminum oxide carrier having a bulk density of less than 1 kg./l. with an aqueous solution of an organic manganese salt, calcining the impregnated carrier a first time between 700° and 1100°C., saturating the thus calcined carrier with ammonia, impregnating the ammonia saturated carrier with a noble metal solution and calcining the carrier a second time at a temperature between 600° and 800°C. The catalyst exhibits improved abrasion resistance and permits more effective oxidation of carbon monoxide and hydrocarbons at lower temperatures utilizing a very low noble metal content.

17 Claims, No Drawings

CATALYST FOR PURIFYING EXHAUST GASES

BACKGROUND OF THE INVENTION

The present invention relates to the preparation of a catalytic composition, and more especially to the preparation of a catalyst suitable for the catalytic oxidation of the incompletely burned components present in exhaust gases.

It is well known that the hydrocarbons and carbon monoxide contained in automobile exhaust gases can be removed by mixing such gases with air and then subjecting the mixture to further combustion in the presence of a catalyst. Catalysts which have proven particularly effective for this purpose are those containing metals of the platinum group on a refractory carrier exhibiting high abrasion resistance.

On such platinum containing catalysts, hydrocarbons are burned at low temperatures. The catalysts manifest the disadvantage, however, that they accelerate the reaction speed of the oxidation of carbon monoxide only at relatively high temperatures, so that the full effectiveness following a cold start of the vehicle engine is achieved only after a considerable delay.

If the platinum is replaced by palladium, the ability of the carbon monoxide adsorbed on the active surface area of the catalyst to react is increased; however, at the same time, the temperature necessary for the oxidation of the hydrocarbons increases. Furthermore, palladium is unstable at operation temperatures above 600°C. and quickly loses its catalytic effectiveness.

In order to overcome these disadvantages, catalysts have been prepared having a combination of palladium with catalytically active metal oxides, e.g., manganese oxide, upon a refractory carrier, such as those described in German Pat. No. 1,442,743. However, these catalysts possess a high degree of stability regarding their activity and abrasion resistance only if aluminum oxide carriers having a high density and a low porosity are employed. Also, the low temperature activity in conjunction with the burning of hydrocarbons is not particularly advantageous with these catalysts.

The effectiveness of catalysts designed for the purification of automobile exhaust gases is dependent, however, not only upon their light-off temperature, but also upon the time which is necessary to reach the ignition point in the case of a cold engine start. Accordingly, it is an advantage if the catalyst is characterized by a low heat capacity, i.e., a low density and/or a low bulk density. Aluminum oxide carriers having a bulk density of less than 1 kg./l. are known, but their practical application is limited by the fact that they manifest unsatisfactory mechanical or physical properties, especially as regards their abrasion characteristics.

It is also known that the activity of known supported manganese/palladium combination catalysts can be increased for the conversion of hydrocarbons if the noble metal content is raised; however, this solution is limited as a result of availability and economic considerations.

Accordingly, a definite need exists for a catalyst composition possessing a high degree of mechanical stability as well as the ability to quickly oxidize residual carbon monoxide and hydrocarbons at low operating temperatures characteristic of cold start conditions, without the necessity of incorporating large amounts of noble metals into the catalyst.

SUMMARY OF THE INVENTION

It is therefore an object of the present invention to provide a catalyst composition which takes advantage of the desirable properties of combined manganese/palladium catalysts supported on refractory aluminum oxide carriers with respect to the carbon monoxide oxidation activity while at the same time maintaining the stability as regards the activity and abrasion resistance under high thermal stress in the case where an aluminum oxide carrier having a low bulk density is employed.

It is a further object of the present invention to provide a catalyst composition which exhibits an improved hydrocarbon oxidation activity, but in connection with which it is not necessary to increase the noble metal content in an uneconomic manner.

It is specific object of the present invention to provide a catalyst composition which permits the full effectiveness of the catalytic converter to be realized in as short a period of time as possible following a cold start of the engine.

Another object of the invention resides in the provision of a process for the preparation of a catalyst meeting the foregoing-delineated criteria.

In accomplishing the foregoing objectives, there has been provided in accordance with the present invention a process for the preparation of a catalyst suitable for the oxidation of incompletely burned components in exhaust gases, particularly automobile exhaust gases, comprising the steps of impregnating an aluminum oxide carrier having a bulk density of between about 0.4 and 1 kg./l. with an aqueous solution of an organic manganese salt, calcining the carrier a first time at a temperature between about 700°C. and 1100°C., after cooling saturating the calcined carrier with ammonia, impregnating the ammonia-saturated carrier with a palladium salt solution, and calcining the carrier a second time at a temperature between about 600°C. and 800°C. The aluminum oxide carrier is one containing predominantly delta-$Al_2O_3$, theta-$Al_2O_3$, alpha-$Al_2O_3$ and mixtures thereof, for example, being a carrier typically produced by calcining aluminum oxide at a temperature between 700° and 1100°C. for a short period of time. In the second impregnating step, the palladium salt solution may also contain a platinum compound, with the ratio of palladium to platinum being generally between about 1:0.1 and 1:5, preferably between about 1:2 and 1:3. The concentration of the organic manganese salt solution and the impregnation time are such that there results a final manganese content of between about 1 and 5 weight percent in the catalyst, and similarly, the concentration and time of impregnation for the solution containing the palladium salt and optionally a platinum compound are such that the final content of palladium plus optional platinum in the catalyst is between 0.01 and 0.5 weight percent, preferably between 0.03 and 0.05 weight percent. The preferred organic manganese salts are salts of organic carboxylic acids, preferably lower aliphatic carboxylic acids and monocyclic aromatic carboxylic acids.

There is also provided in accordance with the present invention an improved catalyst composition comprising an aluminum oxide carrier having a bulk density of between about 0.4 and 1 kg./l. and being selected from delta-$Al_2O_3$, theta-$Al_2O_3$, alpha-$Al_2O_3$ and mixtures thereof, from about 1 to 5 weight percent manganese and preferably between about 2 and 3 weight percent manganese, between about 0.01 and 0.5 weight percent, and preferably between about 0.03 and 0.05 weight percent of palladium or a combination of palladium and platinum, the manganese having been introduced into the carrier by impregnation with an organic manganese salt followed by calcining at a temperature between about 700° and 1100°C., the palladium and optional platinum having been introduced into the carrier by impregnating in a step subsequent to impregnation with the organic manganese salt solution followed by calcining at a temperature between about 600° and 800°C. Between the first calcination step and the second impregnation step, the carrier is preferably saturated with ammonia.

Other objects, features and advantages of the present invention will become apparent from the detailed description of the invention which follows.

DETAILED DESCRIPTION OF THE INVENTION

Suitable for the manufacture of the catalysts according to the present invention are carriers of aluminum oxides or aluminum silicates which have been prepared in the form of pellets, briquettes, spheres or the like of high thermal stability and abrasion resistance. The aluminum oxide must be present in the form of delta-, theta- and alpha-$Al_2O_3$, and it should not contain any gamma- or eta-$Al_2O_3$. While not essential, it is advantageous to maintain the sodium oxide content of the carrier under 0.1 percent and to maintain the content of inorganic anions, such as chloride or sulfate ion, under 0.2 percent. In order to convert an aluminum oxide carrier into the forms mentioned immediately above, the carrier must be calcined from between about 10 and about 120 minutes at a temperature between 700° and 1100°C. before preparation of the catalyst is begun. A particularly suitable carrier for use in the context of the present invention is the commercially available product marketed by Rhone-Progil under the designation SCS 79. This carrier is obtained in the form of aluminum oxide spheres and must be converted into the proper forms of aluminum oxide prior to preparation of the catalyst by calcining at a temperature between about 900° and 1100°C., preferably at about 1000°C.

A suitable carrier is first impregnated with a solution of a manganese salt. Solutions suitable for this first impregnating step of the carrier with manganese are those which comprise a solution of an organic manganese salt. The particular organic anion of the salt is not of particular importance, so long as the salt is readily soluble. Preferred solutions are prepared from a salt of an organic carboxylic acid, most preferably a lower fatty acid or a monocyclic aromatic acid, e.g., manganese propionate, manganese benzoate and the like. The most preferred solutions are prepared from manganese acetate or manganese formate salt.

This first impregnation step is carried out under conventional impregnating conditions which are well known to those skilled in the art. It is important only that the impregnation step be carried out in such a manner that the final catalyst composition contains between about 1 and 5 weight percent of manganese and more preferably between about 2 and 3 weight percent of manganese. Typically, this step is carried out at or near room temperature utilizing a solution containing between about 10 and 70 grams of manganese per liter and an impregnation time of between about 10 and 60 minutes.

It has been rather surprisingly discovered that the mechanical strength of the catalyst is significantly increased when an organic manganese salt is employed in the impregnating solution instead of the conventionally employed inorganic manganese salt, such as the manganese nitrate solution as described in German Pat. No. 1,442,743. Furthermore, the catalytic activity is also advantageously influenced by the use of an organic manganese salt.

Following the first impregnation step, the manganese-containing carrier is subjected to a calcination step at a temperature between about 700° and 1100°C., preferably between about 800° and 1000°C. Calcination is conducted for the normal period of time, namely, for a period of about 10 to 60 minutes. After calcination the manganese is present as an oxide. Typically, the impregnated carrier is first allowed to dry by allowing it to stand for a sufficient period of time at room temperature or by exposing it to an elevated temperature of up to about 140°C. for a short period of time of from about 15 to 120 minutes; however, this drying step is not absolutely essential, as drying will also take place during the initial stages of calcination.

It has also been discovered in accordance with the present invention that it is possible to considerably reduce the amount of noble metal contained by the catalyst composition, while at the same time accomplishing an increase in the activity of the catalyst. This is accomplished by saturating the carrier with ammonia following calcination after the first impregnation step, but prior to the second impregnation step with one or more noble metals. This may be carried out, for example, by treating the carrier with an ammonia solution, preferably at or near room temperature, until saturation takes place. The concentration of the ammonia solution is not critical, and it typically ranges between about 1 and 15 percent, more typically between about 4 and 6 percent. As will be demonstrated by the examples hereinbelow, surprisingly high catalyst activities are obtained with a noble metal content, i.e., palladium or palladium and platinum, of only a few hundredths of a percent.

Conventional impregnating solutions and impregnation conditions are employed in connection with the second impregnating step wherein a noble metal is introduced into the catalyst composition. Therefore, any of the conventional noble metal-containing solutions may be employed, for example, palladium chloride, hexachloroplatinic acid, palladium tetrammine chloride, platinum tetrammine chloride, palladium tetrammine hydroxide, platinum tetrammine hydroxide and others. It is important in connection with this step only that the carrier be impregnated in such a way that the final catalyst composition contains between about 0.01 to 0.5 weight percent and preferably 0.03 to 0.05 weight percent of palladium or of combined palladium and platinum if a mixture of the two metals is employed in accordance with the optional embodiment of the invention. Preferred palladium chloride, and when platinum is present, there is preferably added to the solution an amount of hexachloroplatinic acid. Impregnation may be carried out anywhere between room temperature and the boiling temperature of the solution, the latter temperature being preferred as it normally requires shorter impregnation times. It is not possible to define specific limits for accomplishing the foregoing-delineated final catalyst content of noble metal, but this determination is well within the ordinary level of skill in the art. Typically, however, the impregnating solution contains between about 0.1 and 5 grams per liter of noble metal and impregnation is carried out for a period of time between about 10 and 60 minutes.

In the embodiment of the invention wherein a mixture of palladium and platinum is introduced into the catalyst carrier, the ratio of palladium to platinum typically ranges between about 1:0.1 to 1:5, and preferably between about 1:2 and 1:3.

Following the second impregnation step whereby a noble metal is introduced into the catalyst composition, the catalyst is again calcined at an elevated temperature, typically between about 600° and 800°C. for a period of time ranging from about 10 to 60 minutes.

The following examples are presented to facilitate a more complete understanding of the present invention, it being understood that they are intended to be merely illustrative and not in any sense limitative.

EXAMPLE 1

The commercially available aluminum oxide carrier SCS 79 (available from Rhone-Progil) having a bulk density of 0.72 kg./l. is calcined in a rotary kiln at a temperature between 980° and 1000°C. for a period of 20 minutes so that a mixture of delta-, theta- and alpha-$Al_2O_3$ is present. After cooling to room temperature, the carrier is impregnated with an aqueous solution of manganese acetate containing 35.7 grams of manganese per liter so that after saturation of the porous carrier material with the solution, and after drying at 120°C. for 60 minutes and calcining at 1000°C. for 20 minutes, the carrier has a manganese content of 3 weight percent present as $Mn_2O_3$. After cooling the carrier is saturated with a 5 percent solution of ammonia and is then treated for 3 hours with a palladium chloride solution containing 0.34 grams per liter of palladium, at the boiling point of the solution, so that the finished catalyst No. 1 contains 0.045 weight percent palladium after drying at 120°C. for 60 minutes and calcining at 800°C. for 20 minutes. Catalyst No. 1 has a bulk density of 0.75 kg./l.

EXAMPLE 2

The preparation of catalyst No. 2 is conducted in the identical manner as described in Example 1, except that in place of the palladium chloride solution there is employed a mixed solution of palladium chloride (0.11 grams per liter palladium) and hexachloroplatinic acid (0.26 grams per liter platinum). The final catalyst composition contains 0.014 weight percent palladium and 0.035 weight percent platinum and is characterized by a bulk density of 0.75 kg./l.

EXAMPLE 3

In order to demonstrate that more active and more stable catalysts are obtained in accordance with the preparation method of the present invention as described in Examples 1 and 2, for comparison purposes, a manganese/palladium catalyst is prepared on the same carrier in accordance with the process described in German Pat. No. 1,442,743.

Spherical aluminum oxide SCS 79 is calcined as in Example 1 and after cooling to room temperature the carrier is treated with an aqueous, weakly acid manganese nitrate solution containing an amount of manganese sufficient to produce a catalyst composition containing a manganese content of 3 weight percent, present as $Mn_2O_3$, after the steps of saturation, drying and calcining as described in Example 1. After this, the catalyst is impregnated with a palladium chloride solution containing an amount of palladium sufficient to impart a palladium content of 0.045 weight percent to the catalyst No. 3 after drying and calcining as described above.

The preparation of catalysts No. 4 and 5 is carried out analogously to catalyst No. 3, except that the amount and concentration of the impregnating solution are merely varied so that the finished catalyst No. 4 contains 0.1 weight percent palladium and catalyst No. 5 contains 0.2 weight percent palladium.

EXAMPLE 4

In order to examine the oxidation activity, the catalysts prepared according to Example 1, 2 and 3 are tested, both in fresh condition as well as after a 100 hour aging period in an oxidizing medium at 1000°C., with a mixture of gases that contains either of the following two formulations:

| 1 Vol.-% CO | 500 ppm $C_6H_{14}$ |
| 4 Vol.-% $O_2$ | 4 Vol.-% $O_2$ |
| 95 Vol.-% $N_2$ | 95.95 Vol.-% $N_2$ |

At a space velocity of 50,000 v./v.h., the gas stream is heated from room temperature up to 550°C. prior to entry into the catalyst bed, and the conversion is measured as a function of temperature and is recorded.

The temperature required for the conversion of 50% of the amount of carbon monoxide or n-hexane introduced serves as a measure of the catalyst activity, and is designated as the half-value. The results are set forth in the table below.

In order to examine the abrasion resistance of the catalysts, the following vibration method is applied:

150 cm³ of the catalyst are placed into an iron cylinder having a volume of 200 cm³. The diameter of the cylinder is 50 mm. and its length is 100 mm. The cylinder, through which an air current is passed, is vibrated at 300 cycles per minute and an amplitude of 100 mm. While the dust produced by the abrasion is blown out, the broken catalyst particles are sieved out, for example, particles of from 2.5 to 4.5 mm. in diameter with a 1.5 mm. sieve. Next, the amount of weight loss of catalyst is determined by weighing. This process is again repeated and the weight lost after the second hour is given as a characteristic value for the abrasion resistance of the catslyst particles. The results are set forth in the following table.

| Catalyst | Aging | Half-value temperature (°C) CO | Hexane | Abrasion Resistance Test Wt. % lost after 2nd hr. |
|---|---|---|---|---|
| 1 | fresh | 136 | 272 | 0.36 |
|   | 100 h. at 1000°C. | 131 | 281 | 0.98 |
| 2 | fresh | 155 | 241 | 0.40 |
|   | 100 h. at 1000°C. | 163 | 260 | 0.97 |
| 3 | fresh | 183 | 382 | 0.62 |
|   | 100 h. at 1000°C. | 205 | 392 | 2.45 |

—Continued

| Catalyst | Aging | Half-value temperature (°C) CO | Hexane | Abrasion Resistance Test Wt. % lost after 2nd hr. |
|---|---|---|---|---|
| 4 | fresh | 171 | 343 | 0.70 |
|   | 100 h. at 1000°C. | 180 | 353 | 2.50 |
| 5 | fresh | 166 | 325 | 0.72 |
|   | 100 h. at 1000°C. | 170 | 338 | 2.35 |

The results show that the catalysts produced in accordance with the method of the present invention exhibit considerable advantages over catalysts prepared according to known processes with respect to oxidation activity and abrasion resistance, both in fresh condition and after aging. For example, if the palladium content is raised from 0.045 weight percent to 0.1 and 0.2 weight percent in the case of known catalysts (comparative catalyst No. 4 and No. 5), the properties of the catalyst according to the present invention are still not attained. It has also been shown that the oxidation activity, especially for hydrocarbons, can be improved still more by the addition of platinum to the catalyst. The exceptionally low carbon monoxide oxidation temperature improves, above all, the cold start operation in the case of use of the catalyst in auto exhaust gas converters, whereas the high degree of abrasion resistance permits a much longer period of operation without refilling the catalytic converter. However, while it is understood that the catalysts in accordance with the present invention are particularly suitable as regards their use for the purification of automobile exhaust, the catalysts are also suitable for the total oxidation of incompletely oxidized hydrocarbons and carbon monoxide in industrial exhaust gases.

What is claimed is:

1. A process for the preparation of a catalyst suitable for the oxidation of incompletely burned components in exhaust gases, comprising impregnating a carrier consisting essentially of an aluminum oxide having a bulk density between 0.4 and 1 kg./l. and being selected from delta-$Al_2O_3$, theta-$Al_2O_3$, alpha-$Al_2O_3$ and mixtures thereof with an aqueous solution of a manganese carboxylate, calcining said carrier a first time at a temperature between 700° and 1100°C., after cooling saturating the calcined carrier with ammonia, impregnating the ammonia-saturated carrier with a solution of a noble metal compound thermally decomposable to the noble metal, and calcining said carrier at a temperature between 600° and 800°C. to form said noble metal.

2. The process as defined by claim 1, wherein the aluminum oxide carrier is calcined at temperatures between 900° and 1100°C. before impregnation.

3. The process as defined by claim 1, wherein the noble metal is palladium.

4. The process as defined by claim 1, wherein the noble metal is a mixture of palladium and platinum and the ratio of palladium to platinum is between 1:0.1 and 1:5.

5. The process as defined by claim 4 wherein the palladium is present as palladium chloride and the platinum is present as hexachloroplatinic acid.

6. The process as defined by claim 1, wherein the aqueous manganese carboxylate solution contains an amount of manganese sufficient to provide a final catalyst containing between about 1 and 5 percent by weight manganese.

7. The process as defined by claim 1, wherein the noble metal compound-containing solution contains an amount of noble metal sufficient to provide a final catalyst content of between 0.01 and 0.5 percent by weight noble metal.

8. The process as defined by claim 1, wherein first calcining is between 800°C. and 1000°C.

9. The process as defined by claim 1, wherein said manganese carboxylate is a salt of an organic carboxylic acid selected from the group consisting of lower aliphatic carboxylic acid and monocyclic aromatic carboxylic acids.

10. The process as defined by claim 1, wherein said manganese carboxylate is selected from the group consisting of manganese acetate and manganese formate.

11. A catalyst composition suitable for purification of exhaust gases, comprising a carrier consisting essentially of aluminum oxide selected from delta-$Al_2O_3$, theta-$Al_2O_3$, alpha-$Al_2O_3$ and mixtures thereof and having a bulk density of between about 0.4 and 1 kg./l. from about 1 to 5 percent by weight manganese present as an oxide of manganese and from about 0.01 to 0.5 percent by weight of a noble metal, said catalyst having been prepared by the steps of impregnating said carrier with an aqueous solution of manganese carboxylate, calcining said carrier a first time at a temperature between 700° and 1100°C. after cooling saturating the calcined carrier with ammonia, impregnating the ammonia-saturated carrier with a solution of a noble metal compound, decomposable to the noble metal and calcining said carrier at a temperature between 600° and 800°C. to form said noble metal.

12. A catalyst composition as defined by claim 11 the noble metal content of which amounts to between 0.03 and 0.05 percent by weight of palladium.

13. A catalyst composition as defined by claim 11 the noble metal content of which amounts to between 0.03 and 0.05 percent by weight of palladium plus platinum.

14. The process as defined by claim 1, wherein said noble metal compound is selected from the group consisting of palladium salts, platinum salts, platinum acids and mixtures thereof.

15. The catalyst composition as defined by claim 11, wherein noble metal compound is selected from the group consisting of palladium salts, platinum salts, platinum acids and mixtures thereof.

16. The process as defined by claim 1, wherein said noble metal compound is selected from the group consisting of palladium chloride, hexachloroplatinic acid, palladium tetrammine chloride, platinum tetrammine chloride, palladium tetrammine hydroxide and platinum tetrammine hydroxide.

17. The catalyst as defined by claim 11, wherein said noble metal compound is selected from the group consisting of palladium chloride, hexachloroplatinic acid, palladium tetrammine chloride, platinum tetrammine chloride, palladium tetrammine hydroxide and platinum tetrammine hydroxide.

* * * * *